No. 703,130. Patented June 24, 1902.
O. B. JACOBS.
GATE.
(Application filed May 8, 1901.)
(No Model.)
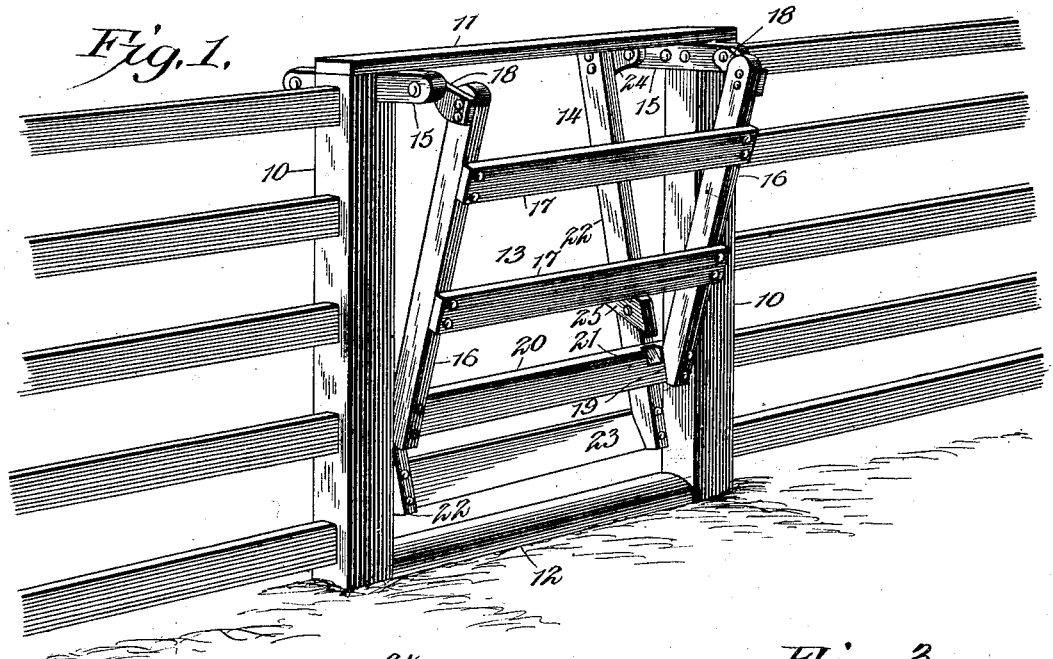
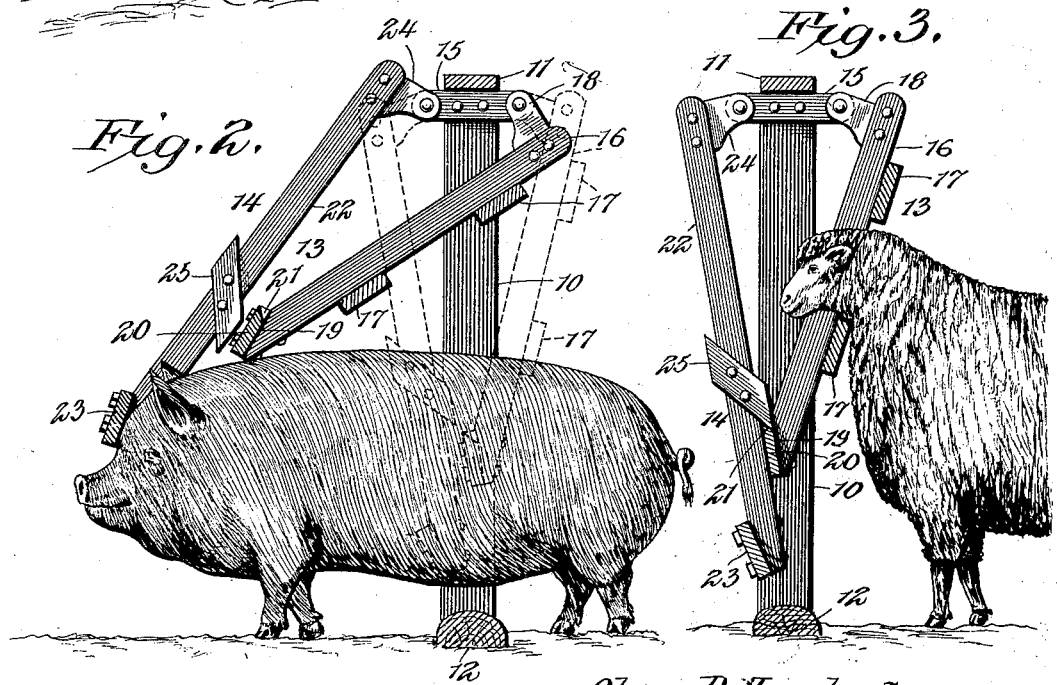
Olaus B. Jacobs, Inventor,
Witnesses

UNITED STATES PATENT OFFICE.

OLAUS B. JACOBS, OF ROLAND, IOWA.

GATE.

SPECIFICATION forming part of Letters Patent No. 703,130, dated June 24, 1902.

Application filed May 8, 1901. Serial No. 59,269. (No model.)

*To all whom it may concern:*

Be it known that I, OLAUS B. JACOBS, a citizen of the United States, residing at Roland, in the county of Story and State of Iowa, have invented a new and useful Gate, of which the following is a specification.

The present invention relates to gates, and the object, broadly, is to provide a device of this character which is arranged to be operated by one class of animals to permit the passage of the same, but be locked against movement and in closed position to another class to prevent their passage.

The invention may be said to be based on the different manners in which different classes of animals will attempt to pass an obstruction, as a fence, and for the purpose of illustration sheep and swine may be taken as examples. A sheep in attempting to pass a fence will simply try to press through the rails or bars by passing its head between the same and trying to force them apart enough to permit of the passage of its body. A pig, on the other hand, will assert its natural propensities by attempting to root under the lower rail or bar and raise it sufficiently to pass under. The invention takes advantage of these differences by providing locking means so arranged that it will be operated by one class, but will in no manner be affected by the other. In this manner different kinds of animals may be permitted to run together and one may be given more area than another.

In order to fully illustrate the invention, an embodiment is described in the following specification and shown in the accompanying drawings, which has proved by actual use to be entirely operative for the purpose and highly satisfactory. It will be understood, however, that the construction set forth is open to many changes and modifications within the scope of the appended claims.

In the drawings, Figure 1 is a perspective view of a gate embodying the invention. Fig. 2 is a longitudinal sectional view illustrating the manner in which it is operated by a pig. Fig. 3 is also a longitudinal sectional view, but showing it locked against the passage of a sheep.

Similar numerals of reference designate corresponding parts in all the figures of the drawings.

In the present instance the construction is such that the gate may be opened by a pig, but is locked against a sheep, and said construction is as follows:

A gap of suitable width is made in the fence, the sides of said gap being formed by the spaced posts or standards 10, preferably connected at their upper ends by a stringer 11 and at their lower ends by a sleeper 12, thus forming the gateway. In this gateway are swung the gate (designated as a whole by the numeral 13) and the locking means therefor, (designated 14.) For this purpose a supporting-arm 15 is secured transversely across the upper end of each post and has its ends projecting beyond both sides of the same.

The gate 13 comprises side bars 16, connected by intermediate cross-rails 17, said side bars having on their upper ends offset hinge-ears 18, which are pivotally connected to the ends of the supporting-arms 15, which project on one side of the gateway. The gate will thus hang at an inclination, as indicated in dotted lines in Fig. 2, and the lower ends of the side bars will thus be located between the posts. The side bars terminate at a point some distance above the ground or sleeper and are beveled, as at 19. To these beveled portions is secured a transverse locking-bar 20, which is provided just inside the side bars with inclined notches 21.

The locking means 14 is in the form of side bars 22, connected at their lower ends by a transverse operating-rail 23 and having offset hinge-ears 24 at their upper ends, which are pivotally secured to those ends of the supporting-arms 15 which are on the opposite sides of the posts from the gate 13. The panel will therefore also hang at an inclination, with its lower end between the posts, and as the side bars 22 are somewhat longer than those of the gate the operating-rail 23 will be located below the locking-bar 20 of the gate. Locking blocks or latches 25 are rigidly fastened to intermediate portions of the side bars 22 and are arranged at a downward inclination. Their inner ends project beyond the inner face of the panel and are located above the bottom locking-bar 20 of the gate and in the same vertical planes as the notches 21 thereof.

The operation of the gate will be readily understood by referring to Figs. 2 and 3. Assuming the gate in normal position, it will be as shown in dotted lines in Fig. 2. Both the gate and locking mechanism hang freely and are not in contact with each other. If now a pig attempts to pass through, it will immediately press its snout against the lowest board, which is the operating-rail in this instance. As this moves freely, the animal will continue to press it forward and will then come into contact with the lower end of the gate. The latches 25 have by this time, however, been moved out of coacting relation with the upper edge of the locking-bar, because of the different pivot-axes of the gate and panel, and therefore when they are brought into engagement they will slide freely upon one another, as shown in Fig. 2. After the pig has passed the gate and panel drop back to their normal position. If a sheep should attempt to force a passage, however, the result would be entirely different. This animal would insert its head between the bars 17 and try to press the gate open. This would cause the gate to move over against the panel, so that the locking-bar 20 would be located directly below the latches 25, and upon a continued movement said latches would engage in the notches 21 of said bar and the panel would act as a brace to stop any further movement.

By this construction it will be seen that a gate is provided which will permit the passage of one class of small stock from one field or place to another, but will prevent the passage of other classes. The objects of the invention are thus attained, and by actual use it has proven both efficient and durable.

From the foregoing it is thought that the construction, operation, and many advantages of the herein-described invention will be apparent to those skilled in the art without further description, and it will be understood that various changes in the size, shape, proportion, and minor details of construction may be resorted to without departing from the spirit or sacrificing any of the advantages of the invention.

Having thus described my invention, what I claim as new, and desire to secure by Letters Patent, is—

1. The combination with a supporting structure having a gateway, of a vertically-swinging gate movably mounted in the gateway and leaving an open space in the same, a lock for the gate, and operating means for the lock located in the open space of the gateway and movable transversely thereof.

2. The combination with a fence having a gateway, of a gate pivotally hung at its upper end in the gateway and leaving an open space in said gateway, a lock for the gate, and operating means for the lock located in the open space of the gateway and movable transversely of the fence.

3. The combination with a fence having a gateway, of a vertically-swinging gate pivotally hung at its upper end in the gateway and terminating short of the bottom thereof leaving an open space beneath said gate, a lock for the gate, and operating means for the lock located in the open space beneath the gate.

4. The combination with a fence having a gateway, of a vertically-swinging gate pivoted in the gateway and leaving an open space therein, locking means pivotally secured at the upper end of the gate, and an operating device for the locking means located in the open space of the gateway, and movable transversely of the fence.

5. The combination with a fence having a gateway, of a gate movably mounted in the gateway and having an open space beneath the same, locking means mounted independently of the gate and arranged in the path of movement thereof, and an operating device also mounted independently of the gate for moving the locking means out of operative position, said operating device being located in the open space beneath the gate and movable transversely of the fence.

6. The combination with a swinging gate, of a swinging panel located adjacent to the gate and arranged to swing in the same direction, said panel being provided with means that engage the gate to lock said panel and gate against independent movement.

7. The combination with a vertically-swinging gate having an open space beneath the same, of a locking element normally located in the path of movement of the gate and coacting with the same to prevent its being opened, and an operating device connected to the locking element and located in the open space directly beneath the lower end of the gate.

8. The combination with a vertically-swinging gate having an open space beneath the same, of a vertically-swinging locking element normally located in the path of movement of the gate and coacting with the same to prevent its being opened, and an operating device connected to the locking element and located in the open space directly beneath the lower end of the gate.

9. The combination with a vertically-swinging gate, of a vertically-swinging locking-panel pivoted independently of the gate, and holding means carried by the gate and panel, said means engaging each other upon the movement of the gate toward the locking-panel, to hold said gate against being opened.

10. The combination with a vertically-swinging gate, of a vertically-swinging locking-panel pivoted independently of the gate, and carrying means arranged to engage the gate to hold the same against opening, said panel having an operating part located below the gate.

11. The combination with spaced standards, of a vertically-swinging gate pivoted at its upper end to the standards, and a vertically-swinging locking-panel also pivoted at its upper end to the standards, and having means for engaging the gate when the latter is swung in one direction to hold the same against being opened.

12. The combination with spaced standards, of a vertically-swinging gate pivoted at its upper end to one side of the standards, and a vertically-swinging locking-panel pivoted at its upper end to the sides of the standards opposite the gate and interlocking devices carried by the gate and panel to hold the gate against being opened.

13. The combination with spaced standards, of a vertically-swinging gate having offset pivotal connections with the upper ends of the standards upon one side thereof, whereby it will normally hang at an inclination to said standards, a panel having offset pivotal connections with the standards upon the side opposite the gate, whereby said panel will also hang at an inclination to the standards and interlocking devices carried by the gate and panel to prevent the opening of the gate.

14. In a gate, the combination with spaced standards having transverse supporting-arms located at their upper ends, of a gate pivoted at its upper end to said arms on one side of the standards and having its lower end located a short distance above the ground or floor, a locking-panel hung at its upper end to the supporting-arms on the side of the standards opposite the gate, and having a transverse operating-rail at its lower end, said rail being located below the lower end of the gate, and catches carried by the locking-panel and engaging the gate upon its movement toward said locking-panel.

In testimony that I claim the foregoing as my own I have hereto affixed my signature in the presence of two witnesses.

OLAUS B. JACOBS.

Witnesses:
O. A. OLESON,
H. E. MYRAH.